United States Patent
Yi et al.

(10) Patent No.: US 9,608,277 B2
(45) Date of Patent: Mar. 28, 2017

(54) METHOD FOR MANUFACTURING ALLOY CATALYST FOR FUEL CELL

(71) Applicant: Hyundai Motor Company, Seoul (KR)

(72) Inventors: Mi Hye Yi, Gyeonggi-Do (KR); Jin Seong Choi, Gyeonggi-Do (KR); Bum Wook Roh, Gyeonggi-Do (KR)

(73) Assignee: Hyundai Motor Company, Seoul (KR)

(*) Notice: Subject to any disclaimer, the term of this patent is extended or adjusted under 35 U.S.C. 154(b) by 111 days.

(21) Appl. No.: 14/568,599

(22) Filed: Dec. 12, 2014

(65) Prior Publication Data
US 2015/0280249 A1  Oct. 1, 2015

(30) Foreign Application Priority Data
Mar. 26, 2014  (KR) ........................ 10-2014-0035185

(51) Int. Cl.
  *H01M 4/92*  (2006.01)
  *C22C 5/04*  (2006.01)
  *H01M 4/88*  (2006.01)

(52) U.S. Cl.
  CPC ............. *H01M 4/921* (2013.01); *C22C 5/04* (2013.01); *H01M 4/8842* (2013.01); *H01M 4/8878* (2013.01); *H01M 4/926* (2013.01); *H01M 2250/20* (2013.01); *Y02E 60/50* (2013.01); *Y02T 90/32* (2013.01)

(58) Field of Classification Search
CPC .. H01M 4/921; H01M 4/8842; H01M 4/8878; H01M 2250/20; C22C 5/04
See application file for complete search history.

(56) References Cited

U.S. PATENT DOCUMENTS

| 2004/0087441 | A1  | 5/2004 | Bock et al. |
| 2010/0234210 | A1* | 9/2010 | Kawamura ......... H01M 4/9041 502/101 |
| 2013/0216934 | A1* | 8/2013 | Park .................... H01M 4/9058 429/482 |

FOREIGN PATENT DOCUMENTS

| JP | 2005-317373 A | | 11/2005 |
| KR | 10-2007-0032368 | | 3/2007 |
| KR | 10-2007-0080484 | | 8/2007 |
| KR | 10-2008-0067554 | | 7/2008 |
| KR | 10-2009-0051648 | | 5/2009 |
| KR | 1020100066876 | * | 1/2012 |
| KR | 10-2013-0033719 A | | 4/2013 |

OTHER PUBLICATIONS

Li, Bing et al., "Carbon-supported Ir-V nanoparticle as novel platinum-free anodic catalyts in proton exchange membrane fuel cell", Intl. Jrl. of Hydrogen Energy, 34(2009) pp. 5144-5151.
Liang, Y. et al., "Preparation and characterization of carbon-supported PtRuIr catalyst with excellent CO-tolerant performance for proton-exchange membrane fuel cells", Jrl. of Catalysis, 238 (2006) pp. 468-476.

* cited by examiner

*Primary Examiner* — Ula C Ruddock
*Assistant Examiner* — Thomas Parsons
(74) *Attorney, Agent, or Firm* — Mintz Levin Cohn Ferris Glovsky and Popeo, P.C.; Peter F. Corless

(57) ABSTRACT

A method for manufacturing an alloy catalyst for a fuel cell is disclosed. The method for manufacturing an alloy catalyst for a fuel cell may include predetermined processes and reaction conditions, such that iridium is alloyed to platinum contained in a cathode carbon support catalyst. Accordingly, time for stabilizing charge on the carbon surface may be reduced and a metal particle size may be controlled, thereby manufacturing high quality products having uniform metal particle distribution and improved durability. In addition, corrosion of a cathode carbon support catalyst in a harsh condition such as vehicle driving may be prevented.

7 Claims, 3 Drawing Sheets

000# METHOD FOR MANUFACTURING ALLOY CATALYST FOR FUEL CELL

CROSS-REFERENCE TO RELATED APPLICATION

This application claims under 35 U.S.C. §119(a) the benefit of Korean Patent Application No. 10-2014-0035185 filed on Mar. 26, 2014, the entire contents of which are incorporated herein by reference.

TECHNICAL FIELD

The present invention relates to a method for manufacturing an alloy catalyst for a fuel cell. In particular, the method for manufacturing the alloy catalyst includes predetermined processes and reaction conditions such that iridium may be alloyed to platinum contained in a cathode carbon support catalyst. Accordingly, time for stabilizing charge on the carbon surface may be reduced and metal particle size may be control, thereby manufacturing products of substantially improved quality such as uniform metal particle distribution and improved durability. Further, corrosion of a cathode carbon support catalyst from harsh condition such as vehicle driving may be prevented.

BACKGROUND

The fuel cell electrode catalyst currently in use may have deterioration such as durability reduction. Particularly, a cathode carbon support catalyst in the fuel cell may corrode due to harsh condition such as driving process, frequent start and stop of a vehicle. For example, in the fuel cell of the vehicle, corrosion of the carbon support catalyst may be caused by generation of high voltage at the time of start and stop during vehicle driving, and contact between the electrode catalyst and reaction gas may deteriorate by water generated at the cathode during fuel cell operation, and thus the operation may depend on carbon fuel instead of oxygen fuel.

Generally, a catalyst such as a Pt/C catalyst has been applied to the cathode carbon support in the fuel cell. In addition, for inhibiting the corrosion of the carbon support catalyst, a method has been developed to use specific metals, for example, iridium (Ir) and ruthenium (Ru), which is belongs to a precious metal, and the catalyst obtained from the method using the precious metal may have substantially improved water-splitting power at the voltage (1.6 V) from platinum (Pt) in the general Pt/C catalyst.

In addition, in the related arts, when Oxygen Evolution Reaction (OER, water-splitting catalyst), i.e, oxides such as $IrO_2$ or $RuO_2$ to the Pt/C electrode is used by mixing thereof to the electrode, durability of the catalyst may generally increase (Sang-Eun Jang and Hansung Kim. (2010, Effect of Water Electrolysis Catalysts on Carbon Corrosion in Polymer Electrolyte Membrane Fuel Cells, J. Am. Chem. Soc., 132, 14700-14701). Further, a method for manufacturing a platinum/ruthenium alloy support catalyst has been reported and the method comprises: mixing a platinum precursor, a ruthenium precursor and a solvent and adjusting pH, mixing a catalyst carrier solution to the resulting mixture and adjusting pH, and then separating, washing and heating the catalyst.

However, the Ru or its oxides may not be suitable since they may have a defect of easy dissolution due to low phase stability at acidic operating condition such as Proton Exchange Membrane Fuel Cell (PEMFC). In addition to the Ru oxide, such defect may occur with alloy-type of Pt or Ru such that metal may disappear by continuous dissolution during operation of the fuel cell. Accordingly, when the fuel cell includes the Ru, the first Oxygen Evolution Reaction (OER) may be sufficient but the activity of the Oxygen Evolution Reaction may be reduced as low as 0 from the second cycle.

In the related art, platinum-iridium alloy particles have been developed. The alloy particles may be formed by calcining a conductive carrier and particles may have platinum and iridium supported on the conductive carrier. Further, a method for manufacturing a catalyst by adding a precursor containing metal ion such as Pt and Ir to ethylene glycol and reducing the mixture thereof has been introduced. In addition, a method for manufacturing a catalyst for a fuel cell has been developed and the method comprises mixing a main catalyst metal precursor, a metal precursor such as iridium as a co-catalyst and a diol compound such as ethylene glycol, adding a carbon support thereto, reducing thereof by using a reducing agent, and then purifying and drying the resulting material.

However, although the above mentioned techniques may provide improvement by applying iridium and the like, methods of manufacturing a product having improved durability have not been achieved yet. For example, process condition has not been improved due to long charge stabilizing time and difficulty to manufacture homogeneous support.

Accordingly, the present invention provides an alloy catalyst which may be manufactured by alloying iridium to the platinum contained in a cathode carbon support catalyst for a fuel cell at a predetermined process and condition, thereby inhibiting corrosion, reducing time for stabilizing carbon zeta-potential, and controlling metal particle size. As consequence, high quality products having uniform metal particle distribution and excellent durability may be obtained.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention may provide technical solutions to the above-described technical difficulties in the related arts.

In one aspect, a method for manufacturing an alloy catalyst for a fuel cell is provided. As such, corrosion at harsh condition may be prevented and durability thereof may be improved due to uniform quality of the alloy catalyst for the fuel cell. Further, time for stabilizing charge on the carbon surface may be reduced due to improved manufacturing processes, and uniform metal particle distribution may be obtained by controlling metal particle size.

In an exemplary embodiment, the present invention provides a method for manufacturing an alloy catalyst for a fuel cell. The method may include: preparing a metal ion solution by dissolving a platinum precursor and an iridium precursor in ethylene glycol; preparing a mixture solution by adding carbon dispersed in ethylene glycol to the metal ion solution; adding NaOH/ethylene glycol solution to the mixture solution to adjust pH of the mixture solution to about 6 to 12 by; reacting the pH-controlled mixture solution at air condition, at a temperature of about 145 to 168° C., for about 3 to 8 hours and cooling the reacted mixture solution to room temperature; and adding acid solution to the cooled mixture solution to adjust pH of the cooled mixture solution of about 1 to 5. The method may further include filtering, washing and drying the resulting mixture solution.

In particular, in preparing the metal ion solution, the platinum precursor may be added with the platinum in an amount of about 0.1 to 10 parts per weight in the ethylene glycol and the iridium precursor may be added with the iridium in an amount of about 0.01 to 10 parts per weight in the ethylene glycol, based on the ethylene glycol of 100 parts per weight, and the precursors may be mixed.

In addition, in preparing the metal ion solution, the platinum precursor and the iridium precursor may be added to ethylene glycol and stirred at a speed of about 150 to 300 rpm for about 1 to 8 hours.

The carbon may be at least one selected from the group consisting of carbon powder, carbon black, acetylene black, activated carbon, carbon fiber, fullerene, carbon nanotube, carbon nanowire, carbon nano-horn and carbon nano ring. In particular, the carbon may be added in an amount of about 0.2 to 10 parts per weight based on the ethylene glycol of 100 parts per weight used for manufacturing the metal ion solution.

The acid solution may be sulfuric acid or nitric acid.

In another aspect, an alloy catalyst for a fuel cell is provided. The alloy catalyst may be manufactured by the method as described above, and may have a metal particle size of about 1 to 10 nm. The alloy catalyst may include $Pt_xIr_y$, where x=1 to 10 and y=1. When the Pt—Ir alloy is loaded on a carbon support, the Pt—Ir alloy may be included in an amount of about 5 to 90 wt %, based on the total weight of the metal and carbon contents in the alloy catalyst.

In still another aspect, the present invention provides a fuel cell for a vehicle and the fuel cell comprises the alloy catalyst as described above. In particular, the Pt catalyst and the Pt—Ir alloy catalyst may be mixed at the weight ratio of about 1:0.2 to 1:5.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
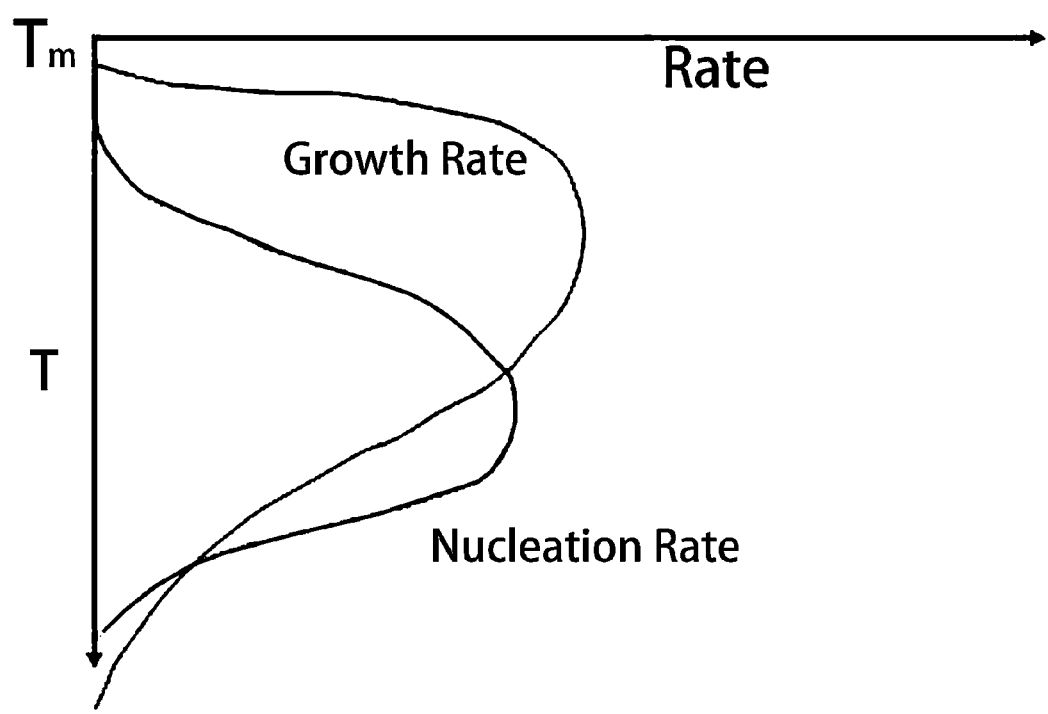
FIG. 1 is a graph showing change on nucleation rate and growth rate of particles depending on temperature in reaction of an exemplary metal ion-containing solution according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a method for manufacturing an alloy catalyst for a fuel cell. The alloy catalyst may include a platinum-iridium alloy catalyst. In particular, the alloy catalyst may be manufactured by a method of the present invention, thereby improving quality of products such as improving durability. The method may comprise: dissolving a platinum precursor and an iridium precursor in ethylene glycol; adding carbon thereto; and adjusting pH, reaction time and reaction temperature. Accordingly, corrosion of a cathode carbon support catalyst in a fuel cell may be prevented although the cathode carbon support is exposed to harsh condition such as vehicle driving.

According to an exemplary method of the present invention, a metal ion solution may be prepared by dissolving a platinum precursor and an iridium precursor in ethylene glycol.

The platinum precursor as used herein may be, but not limited to, a chloride or ammonium-type platinum precursor and the iridium precursor may be, but not limited to, a chloride or ammonium-type precursor. These platinum precursor and iridium precursor may be dissolved in ethylene glycol, and in particular, the platinum may be included in an amount of about 0.1 to 10 parts per weight and the iridium may be included in an amount of about 0.01 to 10 parts per weight, based on the ethylene glycol of 100 parts per weight, and the resulting mixture may be mixed.

The ethylene glycol, as used herein, may be a solvent and a reducing agent. Organic acids such as glycolic acid and oxalic acid may be produced during oxidation process of the ethylene glycol and may be adsorbed to the surface of the reduced platinum-iridium alloy particles, thereby producing the metal particles to have negative zeta-potential.

As used herein, the term "zeta-potential" refers to a net electric potential on a surface of a particle in a colloidal dispersion or solution. For example, in an exemplary embodiment of the present invention, the zeta-potential may be formed at low pH of the colloidal solution in the colloidal solution comprising metal particles and carbon, such that the surface of the metal particles may gain a negative charge and the carbon may gain a positive charge, partially or entirely. Accordingly, the metal particles and the carbon may interact via the zeta-potential formed thereon. As such, the zeta-potential formed, partially or entirely, on the surfaces of particles in the colloidal solution may indicate various states of the colloid, such as stability of colloidal dispersions and electro kinetic or electrophoretic properties.

Accordingly, electrical repulsion may be generated between the metal particles, thereby preventing coagulation of the metal particles. In particular, the organic acids produced on the metal particles may serve as a stabilizer. Meanwhile, adsorbing of the organic acids on the surface of the metal particle may depend on pH.

Moreover, when the metal ion solution is prepared by dissolving the platinum precursor and the iridium precursor, the metal ion solution may be obtained by stirring at a speed of about 150 to 300 rpm for about 1 to 8 hours. When the stirring speed is less than the predetermined speed, or particularly less than about 150 rpm, the particle size may be formed as coarse and uneven due to uneven stirring.

According to an exemplary method of the present invention, carbon may be added to the metal ion solution. In particular, the carbon may be primarily dispersed in the ethylene glycol and added to the metal ion solution to prepare a mixing solution. The carbon generally used in the art may be used in this process without limitation. The carbon may be, but not limited to, at least one selected from the group consisting of carbon powder, carbon black, acetylene black, activated carbon, carbon fiber, fullerene, carbon nanotube, carbon nanowire, carbon nano-horn and carbon nano ring, and the activated carbon or carbon fiber may be particularly used as the carbon source in the present invention. The carbon may be used in an amount of about 0.2 to 10 parts per weight, based on the ethylene glycol used for preparing the metal ion solution of 100 parts per weight or for preparing a cathode carbon support. In particular, the carbon may be mixed in the same solvent as above, particularly the ethylene glycol for maintaining uniformity. In addition, the carbon may be added in the early stage, and thus, time for stabilizing zeta-potential may be reduced by adding the carbon together with the metal precursors such as the platinum precursor and the iridium precursor, thereby reducing time for stabilizing charge to the carbon surface of the prepared cathode carbon support. In addition, difference on uniformity of the carbon zeta-potential depending on the stabilizing time may be prevented. As such, high quality products having substantially improved carbon zeta-potential stabilization may be manufactured without extra stabilizing time by adding the carbon earlier.

As described above, after preparing the mixing solution, when the carbon may be added to the metal ion solution, NaOH/ethylene glycol solution may be added thereto for adjusting pH of the mixing solution. The pH of the solution may be in a range of about 6 to 12. By adjusting pH, zeta-potential on the carbon support may be converted from positive to negative as pH increases in accordance to the applied metals and zeta-potential of the carbon. In other words, during reduction synthesis, when pH is less than about 6, clumped particles may be supported due to reduction of support site for being supported during reaction and coarsening of reduced particles. Particularly, in order to reduce metal size, the reaction may be conducted at about pH 6 or greater, i.e., in a range of about pH 6 to 12, or in particular in a range of about pH 8 to 12. After completing the reaction, the pH of the solution may be reduced.

After adjusting pH as described above, the pH-controlled mixing solution may be reacted in air condition at a temperature of about 145 to 168° C. for about 3 to 8 hours, and the reaction may be subsequently cooled to room temperature.

When the reaction temperature is less than a predetermined range or particularly less than about 145° C., particles may not properly be formed since sufficient thermal energy to reduce the metal precursor is not provided, and temperature may not reach the nucleation temperature for proper reduction. Further, as shown the graph in FIG. 1 which shows change on nucleation rate and growth rate of particles depending on temperature, nucleation and growth of the particles may compete with each other as temperature increases. In the earlier stage of temperature rising, new particles may be formed due to rapid nucleation, but when the temperature rises to specific temperature or greater, growth rate may increase as the nucleation rate may decrease, such that size of the existing formed particles may increase rather than forming further particle. When the temperature rises to a temperature greater than a predetermined temperature range, growth of particles may occur without nucleation. Thus, if the temperature is substantially elevated, growth of the formed particles may be substantial rather than nucleation, such that the existing formed particles may increase in size but the size between particles may be non-uniform. As such, some particles may be coarse. Further, when the reaction time is substantially reduced, particle growth may not be sufficient after reduced particle is formed. When the reaction time increases, particles may grow substantially large in size and be coarse.

Afterwards, acid solution may be added to the cooled mixing solution to control pH to about 1 to 5, and the solution may be filtered, washed and dried. In particular, the acid solution may be aqueous solution of acid such as sulfuric acid and nitric acid. By adding the acid solution, pH of the reacted mixing solution may be controlled to a range of about pH 1 to pH 5, and then the mixing solution may be transferred to a filter, filtered through a fine filter paper, washed and dried. The washing may be conducted with water. When the controlled pH is less than about 1 after reaction, the formed alloy particles may be dissolved due to high acidity, and when the pH is greater than about 5, interaction between particles and carrier may be reduced, thereby the alloy particles may not be supported in the carrier enough and remained in the solution.

The particle size may be controlled by controlling reaction condition. For example, the reaction may be conducted at about pH 6 or greater at a predetermined temperature and for a predetermined time and then pH of the solution may be reduced after the reaction is completed. Further, by adjusting pH, when difference of zeta-potential of the metal and the carbon is respectively stabilized and the metal having uniform particle size is uniformly coated on the carbon, an alloy catalyst comprising a cathode carbon support may be manufactured with improved physical properties.

As described above, according to various exemplary embodiments of the present invention, the alloy catalyst may have substantially improved and uniform durability such as corrosion resistance compared to conventional alloy catalysts and the alloy catalyst may be manufactured by adding carbon in early step of preparing and adjusting pH and reaction condition.

In an exemplary embodiment, a method for manufacturing a Pt—Ir alloy catalyst is provided. The method may not be directed to conventional Pt—Ru alloy and the use of the Pt—Ir alloy may improve durability at harsh condition compared to the use of Pt. Particularly, the conventional Pt—Ru alloy catalyst may be dissolved at acidic condition as the fuel cell reaction condition, but the Pt—Ir alloy catalyst according to exemplary embodiments of the present invention may not be influenced by the acidic condition. Although Ir and Ru may have water electrolyzing function, the Ru alloy may be rapidly disappeared in the respect of durability and may deteriorate during water electrolysis. In contrast, the Ir alloy may remain constantly and may function as water electrolysis continuously. Further, the Pt may have a particle size of about 139 pm and face centered cubic shape, and the Ru applied to the Pt as an alloy may have particle size of about 134 pm and hexagonal close packing shape. Meanwhile, the Ir applied to the Pt may have a particle size of about 136 pm and face centered cubic shape like the Pt. Accordingly, the Ir may be used instead of the Ru to improve particle suitability, and may have substantially greater electro negativity and crystal structure such as shape of particle arrangement and lattice than the Ru. Accordingly, when durability of the Pt—Ir alloy catalyst is tested, corrosion of the carbon support may be significantly reduced compared to a conventional Pt catalyst.

As described above, since the Ir and its oxides may have better water-splitting power or $O_2$ generation power (OER) than the Pt, the Pt—Ir alloy may be suitable for a water-splitting catalyst for improving durability of the fuel cell electrode. In particular, when the fuel cell electrode including Pt—Ir alloy are applied to a vehicle, charge may be generate by splitting water before the carbon support corrosion is caused by high voltage generation during frequent start and stop. Further, during the operation of the fuel cell, due to reduction of reaction surface between the reaction gas and the electrode catalyst by formation water, the alloy catalyst may dissociate water, thereby generating charge during Oxygen Evolution Reaction using the carbon support, thereby compensating charge deficiency caused by oxygen reduction deficiency and inhibiting the carbon support corrosion simultaneously.

Figure 2:
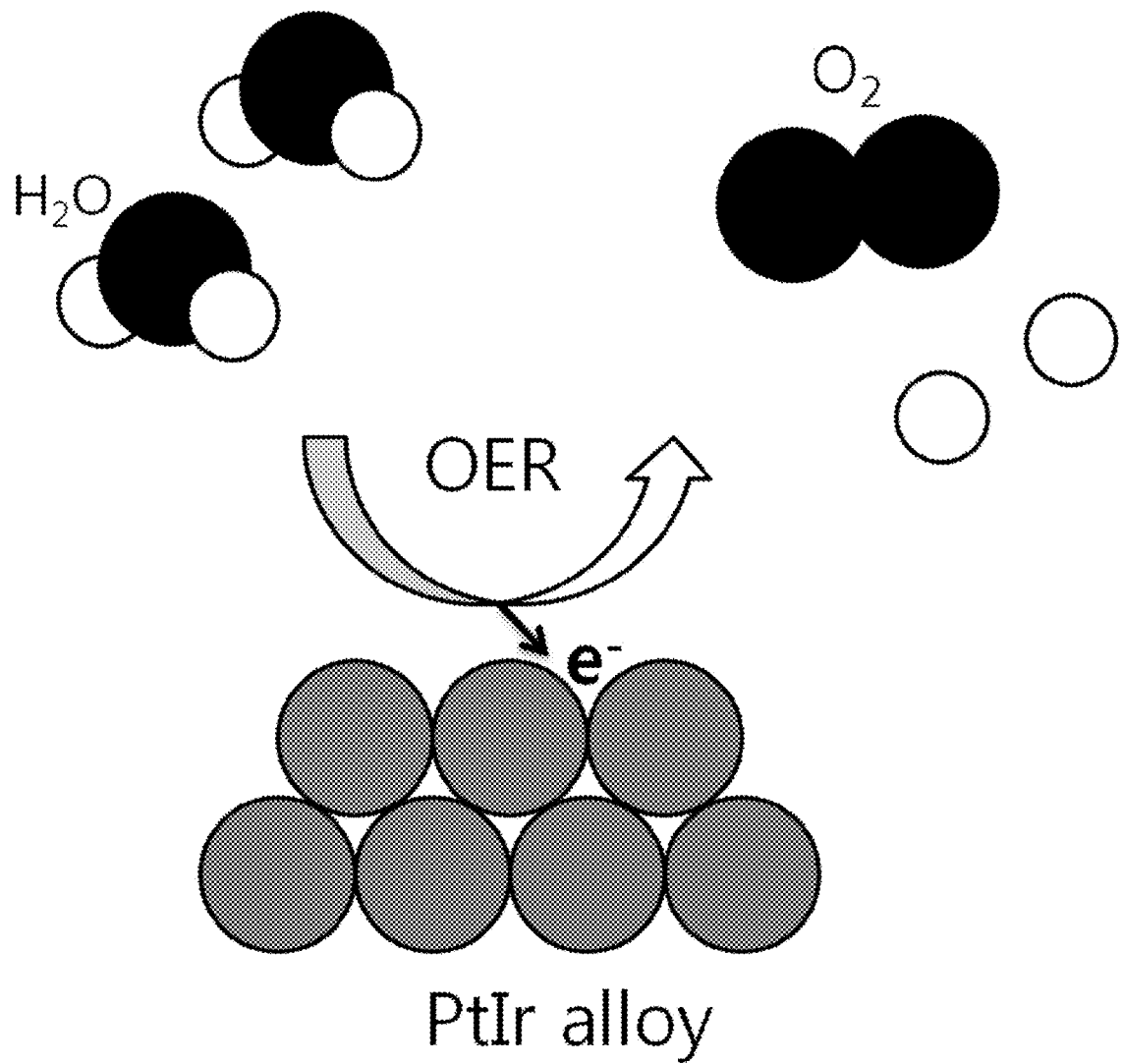
FIG. 2 illustrates an exemplary Oxygen Evolution Reaction generated in an exemplary fuel cell containing an exemplary alloy catalyst for a fuel cell according to an exemplary embodiment of the present invention.

FIG. 2 shows Oxygen Evolution Reaction generated in an exemplary alloy catalyst of an exemplary fuel cell.

Pt—Ir/C alloy catalyst for an exemplary fuel cell may be prepared by one-step reduction support synthesis according to an exemplary method which applies a polyol process for manufacturing the conventional Pt/C.

The alloy catalyst manufactured according to exemplary embodiments of the present invention may have a metal particle size of about 1 to 10 nm and the alloy catalyst may include $Pt_xIr_y$, where x=1 to 10, y=1. In addition, when Pt—Ir alloy is loaded on a carbon support, the Pt—Ir alloy may be included in an amount of about 5 to 90 wt %, based on the total weight of the metal and carbon contents in the alloy catalyst.

The alloy catalyst containing the Pt—Ir alloy according to various embodiments of the present invention as described above may be also applied as an electrode catalyst for a fuel cell by mixing with the conventional catalyst containing Pt. The mixing ratio of the Pt and the Pt—Ir alloy may be in a range of about 1:0.2 to about 1:5 by weight ratio.

Further, the present invention provides a fuel cell for a vehicle comprising the Pt—Ir alloy catalyst.

EXAMPLES

The following examples illustrate the invention and are not intended to limit the same.

Example

A platinum precursor (Platinum chloride; $PtCl_4$) of about 0.65 g and an iridium precursor (Iridium chloride hydrate, $IrCl_3$—$H_2O$) of about 0.16 g were dissolved in ethylene glycol (EG) in about 100 ml and stirred at about 250 rpm for about 1 hour. Activated carbon of about 0.5 g dissolved in about 50 ml of ethylene glycol was added to the stirred solution.

Subsequently, about 0.4 g of NaOH/EG solution at a mixing ratio of about 1:25 by weight was added thereto to control pH of the solution to about 9.5, and the resulting mixture was reacted at air condition and at a temperature of about 160° C. for about 5 hours, and then cooled to room temperature.

Then, about 3 ml of about 0.5 M sulfuric acid solution was added thereto, and the resulting solution was transferred to a filter, and filtered through a fine filter paper, and then washed and dried to obtain an alloy catalyst for a fuel cell (PtIr-MEA).

Experimental Example 1

Figure 3:
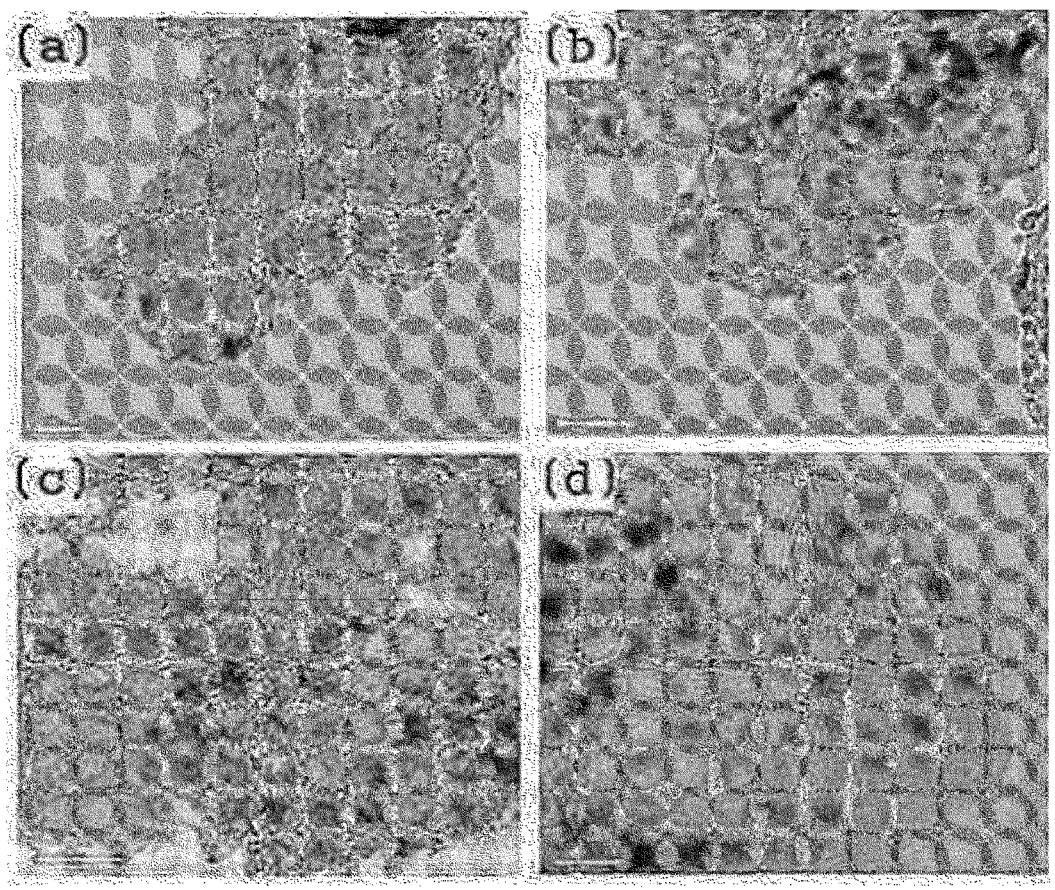
FIG. 3 shows photographic views from transmission electron microscopy (TEM) for identifying exemplary microstructures of Pt/C manufactured in Comparative Example 1 and Pt/Ir/C manufactured in Example of the present invention ((a): Pt/C at 100 k magnification scale; (b): Pt/C at 300 k magnification scale; (c): PtIr/C at 50 k magnification scale; and (d): PtIr/C at 300 k magnification scale).

In order to identify microstructures of the Pt/C prepared in the commercially available MEA purchased from G company in Comparative Example 1 and the PtIr/C prepared in Example 1, microscopic images were obtained from TEM and compared. As shown in FIG. 3, clear difference between the two micro structures was observed. In FIG. 3, (a) of Pt/C at 100 k magnification scale, (b) of Pt/C at 300 k magnification scale, (c) of PtIr/C at 50 k magnification scale and d) PtIr/C at 300 k magnification scale are shown.

Experimental Example 2

In order to test durability of the alloy catalyst prepared in Examples, a commercially available catalyst Pt/C for a vehicle in Comparative Example 2, and an MEA prepared by mixing the Pt—Ir/C prepared in Example 1 and Pt/C at the weight ratio of 1:4 according to an exemplary embodiment were applied to a fuel cell system (Breadboard, BB) together with the commercially available MEA (G company) and then their accelerated durability were tested.

The results of testing durability of the catalysts such as degradation ratio and degradation rate at the beginning and every 100$^{th}$ cycle are shown in Table 1.

TABLE 1

| MEA | Commercially available product (G company) (Comparative Example 1) | Pt-only/C (Comparative Example 2) | Pt/C + PtIr/C Preparation Example |
|---|---|---|---|
| Performance (Degradation ratio: %) at 0.6 A/cm$^2$ | 0.536 V (reduced by about 24.9%) | 0.648 V (reduced by about 12.3%) | 0.658 V (reduced by about 10.4%) |
| Degradation rate at 0.6 A/cm$^2$ (μV/hr) | −96.2 | −50.2 | −41.9 |

As shown in Table 1, the PtIr/C-containing MEA including an exemplary alloy catalyst of the present invention may have improved durability due to less degradation ratio than the Pt-only/C-containing MEA.

During manufacturing an exemplary alloy catalyst for a fuel cell containing iridium according to the present invention, since the iridium (Ir) has greater water splitting power, i.e., oxygen generating power than Pt, the Ir may be used as a water-splitting catalyst for improving durability of an anode of a fuel cell.

Accordingly, the present invention may provide advantages such as generating charge by splitting water before the carbon support corrosion is caused by high voltage generation at frequent start and stop of an engine during operation of a fuel cell, compensating charge deficiency caused by oxygen reduction deficiency by forming water generated during operation of the fuel cell, and inhibiting the carbon support corrosion simultaneously.

Further, the method of the present invention comprising a step of adding carbon at the time of preparing a metal precursor solution, which may provide advantages such as simplifying manufacturing process since time for stabilizing carbon surface charge of a cathode support may not be required, stabilization of zeta-potential may be substantially improved, and a uniform products may be obtained. Moreover, in the method of the present invention, particle size may be controlled by adjusting pH, temperature and reaction time, and thereby manufacturing a uniform and high quality alloy catalyst.

According to various exemplary embodiments of the present invention, the alloy catalyst may be applied to an electrode of a fuel cell. In particular, when the alloy catalyst prepared by exemplary methods of the present invention is applied to a fuel cell for a vehicle, a product may have improved durability at harsh condition, such as during frequent start and stop.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing an alloy catalyst for a fuel cell, which comprises:
   preparing a metal ion solution by dissolving a platinum precursor and an iridium precursor in ethylene glycol;
   preparing a mixture solution by adding carbon dispersed in ethylene glycol to the metal ion solution;
   adding NaOH/ethylene glycol solution to the mixture solution to adjust pH of the mixture solution to about 6 to 12;
   reacting the pH-adjusted mixture solution at air condition at a temperature of about 145 to 168° C. for about 3 to 8 hours and cooling the reacted mixture solution a room temperature; and
   adding an acid solution to the cooled mixture solution to adjust pH of the cooled mixture solution to about 1 to 5.

2. The method for manufacturing alloy catalyst for a fuel cell of claim 1, wherein the method further comprise filtering, washing and drying after adding the acid solution.

3. The method for manufacturing alloy catalyst for a fuel cell of claim 1, wherein, in preparing the metal ion solution, the platinum precursor is added in ethylene glycol in an amount of the platinum of about 0.1 to 10 parts per weight and the iridium is added in ethylene glycol in an amount of the iridium of about 0.01 to 10 parts per weight based on the ethylene glycol of 100 parts per weight and mixed.

4. The method for manufacturing alloy catalyst for a fuel cell of claim 1, wherein, in preparing the metal ion solution, the platinum precursor and the iridium precursor are added to ethylene glycol and then stirred at a speed of about 150 to 300 rpm for about 1 to 8 hours.

5. The method for manufacturing alloy catalyst for a fuel cell of claim 1, wherein the carbon is at least one selected from the group consisting of carbon powder, carbon black, acetylene black, activated carbon, carbon fiber, fullerene, carbon nanotube, carbon nanowire, carbon nano-horn and carbon nano ring.

6. The method for manufacturing alloy catalyst for a fuel cell of claim 1, wherein the carbon is added in an amount of about 0.2 to 10 parts per weight based on the ethylene glycol of 100 parts per weight used for manufacturing the metal ion solution.

7. The method for manufacturing alloy catalyst for a fuel cell of claim 1, wherein the acid solution is sulfuric acid or nitric acid.

* * * * *